(12) United States Patent
Hoefner et al.

(10) Patent No.: US 8,977,652 B2
(45) Date of Patent: Mar. 10, 2015

(54) CLIENT-SIDE API FRAMEWORK FOR UNIFORM RESOURCE IDENTIFIER (URI) MANIPULATIONS

(75) Inventors: Ture Hoefner, Golden, CO (US); Robert Bergman, Westminster, CO (US); Timmothy Pesce, Arvada, CO (US)

(73) Assignee: Oracle International Corporation, Redwood Shores, CA (US)

( * ) Notice: Subject to any disclaimer, the term of this patent is extended or adjusted under 35 U.S.C. 154(b) by 398 days.

(21) Appl. No.: 12/561,885

(22) Filed: Sep. 17, 2009

(65) Prior Publication Data

US 2011/0066741 A1     Mar. 17, 2011

(51) Int. Cl.
*G06F 17/30* (2006.01)
*G06F 7/04* (2006.01)

(52) U.S. Cl.
CPC ............................. *G06F 17/30876* (2013.01)
USPC .............................................. 707/802; 726/5

(58) Field of Classification Search
None
See application file for complete search history.

(56) References Cited

U.S. PATENT DOCUMENTS

| | | | |
|---|---|---|---|
| 7,882,546 B2* | 2/2011 | Laertz et al. | 726/5 |
| 2003/0145094 A1* | 7/2003 | Staamann et al. | 709/229 |
| 2005/0044185 A1* | 2/2005 | Hind et al. | 709/219 |
| 2008/0313648 A1* | 12/2008 | Wang et al. | 719/315 |
| 2009/0161854 A1* | 6/2009 | Ku et al. | 379/207.16 |
| 2009/0185040 A1* | 7/2009 | Yang et al. | 348/207.11 |
| 2009/0193126 A1* | 7/2009 | Agarwal et al. | 709/228 |
| 2009/0327517 A1* | 12/2009 | Sivasubramanian et al. | 709/238 |
| 2010/0228963 A1* | 9/2010 | Kassab et al. | 713/150 |
| 2011/0145898 A1* | 6/2011 | Laertz et al. | 726/6 |
| 2012/0303678 A1* | 11/2012 | Oliver et al. | 707/812 |
| 2013/0014020 A1* | 1/2013 | Dixon et al. | 715/738 |

OTHER PUBLICATIONS

Danny Goodman, "JavaScript Core Language Reference", May 9, 2001, 7 pages.*
Non Patent Literature document titled "Web Services for Remote Portlets-Strengths and Weaknesses Encountered within the European Learning Grid Infrastructure Project" dated Jul. 5, 2006.*
Sun Java System Portal Server Secure Remote Access Overview, dated Mar. 2004.*

* cited by examiner

*Primary Examiner* — Tarek Chbouki
(74) *Attorney, Agent, or Firm* — Kilpatrick Townsend & Stockton LLP

(57) ABSTRACT

Techniques for manipulating URIs that have been rewritten for XmlHttpRequests (XHRs) and/or Web Services for Remote Portlets (WSRP). In one set of embodiments, a URI rewriter factory module is provided that is configured to determine and select a URI rewriter module based upon an input URI string. The input URI string may be, for example, in the form of a Javascript pseudo-protocol link, a remote proxy URI, or both. The selected URI rewriter module can then parse the input URI string to generate a URI object that has methods for manipulating the input URI string and for outputting the resulting manipulated URI as a string.

19 Claims, 4 Drawing Sheets

CLIENT-SIDE API FRAMEWORK FOR UNIFORM RESOURCE IDENTIFIER (URI) MANIPULATIONS

BACKGROUND

Embodiments of the present invention relate to Web applications, and in particular to techniques for manipulating uniform resource identifiers (URIs) on the client side of a Web application.

URI strings are often manipulated on the client side of Web-based applications. Such URI manipulations have become more complex with the recent widespread use of technologies such as XmlHttpRequests (XHRs) and Web Services for Remote Portlets (WSRP).

XHR is a Document Object Model (DOM) API that may be used inside a Web browser scripting language (such as Javascript) to send a hypertext transfer protocol (HTTP) request directly to a Web server and to load server response data directly back into the scripting language. When XHRs are used in Web portal applications (e.g., applications built using Oracle WebLogic Portal), URI strings may be rewritten into Javascript pseudo-protocol links. These Javascript pseudo-protocol links may invoke one or more Javascript functions to process the XHRs. For example, a URI string such as:

"http://www.oracle.com"

may be rewritten into a Javascript pseudo-protocol link such as:

"javascript:com.mystuff.update('http://www.oracle.com');return false;"

Therefore, the original URI string "http://www.oracle.com" has now been rewritten to be included in the Javascript function call "javascript:com.mystuff.update( )".

WSRP is a network protocol standard designed for communicating with remote portlets. When WSRP portlets are used for Web applications, non-proxy URI strings may be rewritten into remote proxy URIs. A remote proxy URI includes a non-proxy URI (also referred to as a target URI) as part of its path or perhaps as a query parameter. For example, a non-proxy URI such as:

"http://www.oracle.com"

may be rewritten into a remote proxy URI such as:

"http://proxy.eg.com/proxy/www.oracle.com"

Therefore, a non-proxy URI string such as "http://www.oracle.com" has now been rewritten to be included in a remote proxy URI such as "http://proxy.eg.com/proxy/www.oracle.com".

In some cases, a URI string may be rewritten into both a Javascript pseudo-protocol link and a remote proxy URI. For example, a URI string such as "http://www.oracle.com"

may be written as:

"javascript:com.mystuffupdate('http://proxy.eg.com/proxy/www.oracle.com');return false;"

Generally speaking, existing client-side URI manipulation frameworks cannot recognize URI strings that have been rewritten into Javascript pseudo-protocol links and/or remote proxy URIs as described above. Rather, these existing URI manipulation solutions can only be used for manipulating URI strings in their original forms (e.g., URI strings that have not been rewritten into Javascript pseudo-protocol links and/or remote proxy URIs). Accordingly, Web developers may have to develop new URI manipulation code specifically for manipulating URI strings that have been rewritten into Javascript pseudo-protocol links and/or remote proxy URIs, thereby increasing development cost and complexity.

BRIEF SUMMARY

Embodiments of the present invention provide techniques for transparently manipulating URIs including URIs that have been rewritten for XmlHttpRequests (XHRs) and/or Web Services for Remote Portlets (WSRP). In one set of embodiments, a URI rewriter factory can be provided that is configured to determine and select a URI rewriter based upon an input URI string. The input URI string can be, for example, in the form of a Javascript pseudo-protocol link, a remote proxy URI, or both. A selected URI rewriter can then parse the input URI string to generate a URI object that has methods for manipulating the input URI string and for outputting the resulting manipulated URI as a string.

Embodiments of the present invention allow for transparent manipulation of URI strings on the client side of Web applications regardless of whether the URI strings have been rewritten for XHRs and/or WSRP. Accordingly, the same set of code may be used for transparently manipulating (1) URIs that have been rewritten for XHRs and/or WSRP and (2) URIs that have not been rewritten at all.

Embodiments of the present invention may be used in conjunction with various systems including, but not restricted to, software systems including enterprise software systems, hardware systems, and others.

In one set of embodiments, a method for manipulating a uniform resource identifier (URI) is provided. The method comprises receiving, at a processing system, an input string encoded in a first format; processing, at the processing system, the input string to identify one or more strings, wherein at least one string identified from the processing is a URI string; and performing, at the processing system, one or more operations on the URI string.

In one embodiment, the first format is a format used to support XmlHttpRequests (XHRs) or Web Services for Remote Portlets (WSRP).

In one embodiment, the input string is encoded as a Javascript pseudo-protocol link or a proxy URI.

In one embodiment, processing the input string to identify one or more strings comprises parsing the input string to identify at least one URI string included in the input string.

In one embodiment, parsing the input string comprises parsing a Javascript pseudo-protocol link to identify at least one URI string included in the Javascript pseudo-protocol link.

In one embodiment, parsing the input string comprises parsing a proxy URI string to identify a target URI string included in the proxy URI string, wherein the target URI string is a non-proxy URI string.

In one embodiment, parsing the input string comprises returning the input string.

In one embodiment, the one or more operations performed on the URI string comprises parsing the URI string, replacing template keys with values in the URI string, and performing create, read, update, and delete operations on one or more components of the URI string.

In one embodiment, the method above further comprises selecting a URI rewriter for processing the input string.

In one embodiment, the URI rewriter selected for processing the input string is configured to parse the input string to identify at least one URI string.

According to another set of embodiments, a computer-readable storage medium storing a plurality of instructions is provided. The plurality of instructions comprise instructions that cause the processor to receive an input string in a first format; instructions that cause the processor to process the input string to identify one or more strings, wherein at least one string identified from the processing is a URI string; and instructions that cause the processor to perform one or more operations on the URI string.

According to another set of embodiments, a system for manipulating a uniform resource identifier (URI) is provided. The system comprises a memory configured to store an input string and a processor coupled to the memory. In various embodiments, the processor is configured to receive an input string in a first format; process the input string to identify one or more strings, wherein at least one string identified from the processing is a URI string; and perform one or more operations on the URI string.

The foregoing, together with other features and embodiments, will become more apparent when referring to the following specification, claims, and accompanying drawings.

DETAILED DESCRIPTION

In the following description, for the purposes of explanation, specific details are set forth in order to provide a thorough understanding of embodiments of the invention. However, it will be apparent that the invention may be practiced without these specific details.

Embodiments of the present invention provide a client-side uniform resource identifier (URI) manipulation framework for transparently manipulating URIs including URIs that have been rewritten for XmlHttpRequests (XHRs) and/or Web Services for Remote Portlets (WSRP). In one set of embodiments, a URI rewriter factory can be provided that is configured to determine and select a URI rewriter based upon an input URI string. The input URI string may be, for example, in the form of a Javascript pseudo-protocol link, a remote proxy URI, or both. A selected URI rewriter can then parse the input URI string to generate a URI object that has methods for manipulating the input URI string and for outputting the resulting manipulated URI as a string.

Figure 1:
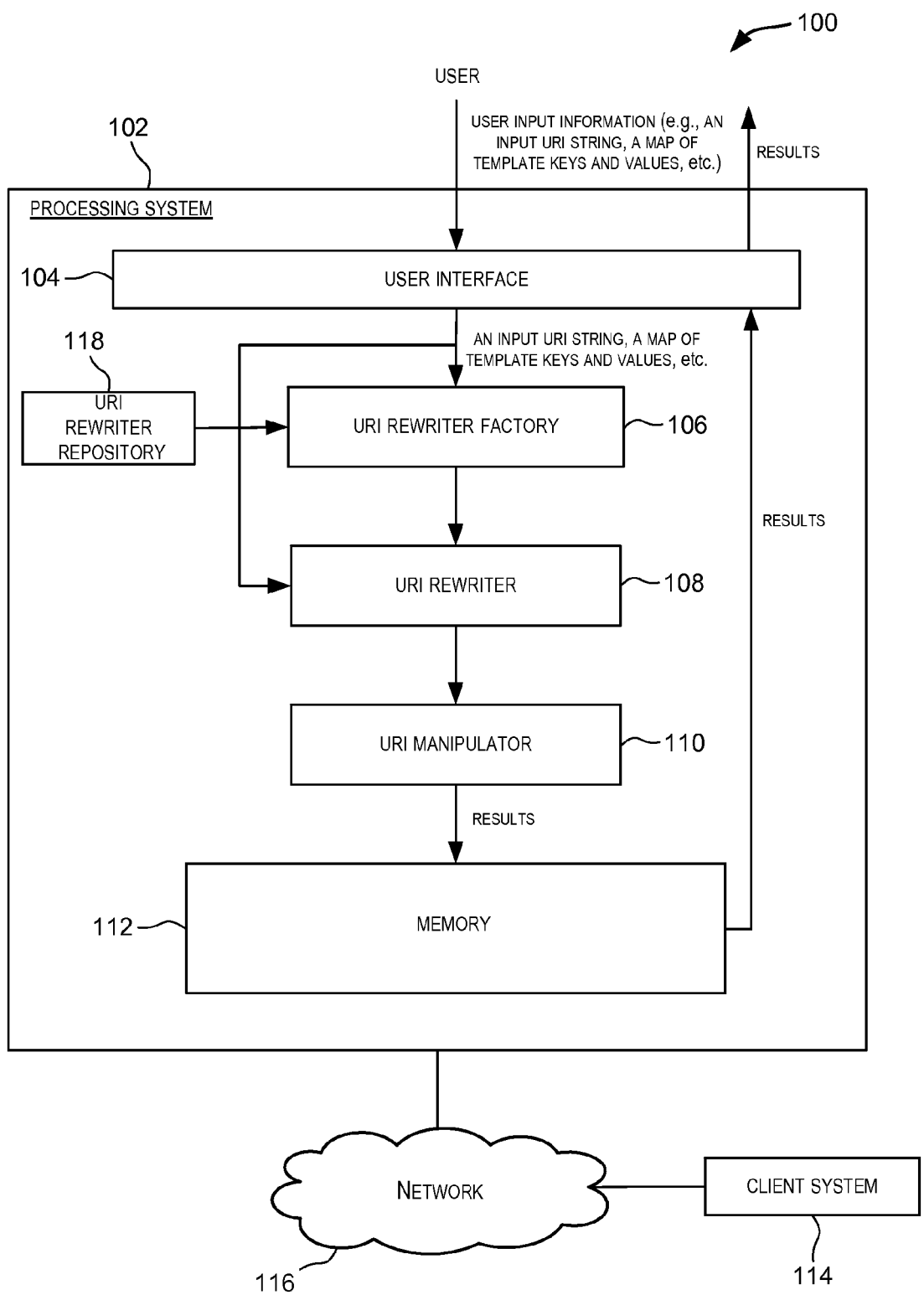
FIG. 1 is a simplified block diagram of a system incorporating an embodiment of the present invention.

FIG. 1 is a simplified block diagram of a system 100 incorporating an embodiment of the present invention. As depicted in FIG. 1, system 100 can comprise a processing system 102 that is configured to transparently manipulate one or more URI strings including URI strings that have been rewritten for XHRs and/or WSRP. Processing system 102 can include several modules that facilitate the transparent manipulation of URI strings. For example, processing system 102 can include a user interface module 104, a URI rewriter factory module 106, a URI rewriter module 108, a URI manipulator module 110, and a memory 112. These modules can be implemented in software (e.g., code, instructions, programs) executed by a processor of processing system 102, hardware, or combinations thereof. It should be apparent that the modules depicted in FIG. 1 are not intended to limit the scope of the present invention, as recited in the claims. In alternative embodiments, processing system 102 may have greater or fewer modules than the ones depicted in FIG. 1. In certain embodiments, the processing performed by system 102 may be implemented as a public Javascript API.

User interface 104 can provide an interface for receiving input information from a user of processing system 102 and for outputting information from processing system 102. The input information received from a user of processing system 102 via user interface 104 can include one or more input URI strings. In certain embodiments, an input URI string received from a user of processing system 102 can be encoded as a Javascript pseudo-protocol link and/or a remote proxy URI. For example, an input URI string such as:

"javascript:com.mystuffupdate('http://www.oracle.com');return false;"

specifies a Javascript pseudo-protocol link with the following URI string included in the link:

"http://www.oracle.com"

As another example, an input URI string such as:

"http://proxy.eg.com/proxy/www.oracle.com"

specifies a proxy URI string with the following target URI (non-proxy URI string) included in the proxy URI:

"http://www.oracle.com"

In other embodiments, an input URI string received from a user of processing system 102 can be a simple, non-rewritten URI string. For example, input URI string "http://www.oracle.com" is a URI string that has not been rewritten in any manner.

In one set of embodiments, input information received from a user of processing system 102 via interface 110 can also include other information associated with the input URI string. For example, the information received and associated with the input URI string can include information related to a map of template keys and values. Such information can be used for performing one or more operations on the input URI string such as template replacement of the input URI string, as will be described below.

In one set of embodiments, the input information (such as one or more input URI strings) received by user interface 104 can be received from a device or machine rather than directly from a user. For example, the input information can be provided by a client system 114 located remotely from processing system 102 and coupled communicatively with processing system 102 via communication network 116. Client system 114 can be, e.g., a computer, a mobile device such as a cell phone, a personal digital assistant (PDA), and/or the like. In these embodiments, client system 114 can be configured to provide input information periodically to processing system 102 via communication network 116. Communication network 116 can be any network configured for data communication such as a local area network (LAN), a wide area network (WAN), the Internet, and the like. Various different communication protocols may be used to communicate data through communication network 116 including wired and wireless protocols.

In one set of embodiments, processing system 102 can be configured to transparently manipulate one or more input URI strings received via user interface 104 including input URI strings that have been rewritten for XHRs and/or WSRP. For example, the received input URI strings can be in the form of Javascript pseudo-protocol links, remote proxy URIs, or both. Alternatively, the received input URI strings can be URI strings that have not been rewritten for XHRs and/or WSRP and thus remain in their original forms. Accordingly, the input URI strings received by processing system 102 can be transparently manipulated regardless of whether the input URI strings have been rewritten (e.g., for XHRs and/or WSRP) or not.

For the purposes of simplifying the following description, it is assumed that the input URI strings received by processing system 102 are encoded as Javascript pseudo-protocol links and/or remote proxy URIs, if the input URI strings have been rewritten for XHRs and/or WSRP. However, this is not intended to limit the scope of the present invention. Processing system 102 can also receive input URI strings that have been rewritten for any other purpose.

In one set of embodiments, a URI rewriter factory module 106 can be provided that is configured to determine and select, from a list of URI rewriters stored in a URI rewriter repository 118, a URI rewriter based upon an input URI string received by processing system 102. The selected URI rewriter can then be used to parse the input URI string to generate a URI manipulator object (e.g., URI manipulator 110). For example, if an input URI string received by processing system 102 is a Javascript pseudo-protocol link, the URI rewriter selected for the input URI string can parse the Javascript pseudo-protocol link to generate a URI object corresponding to the string included in the Javascript pseudo-protocol link (i.e., the original URI string before it was rewritten into the Javascript pseudo-protocol link). As another example, if an input URI string received by processing system 102 is a remote proxy URI string, the selected URI rewriter for the input URI string can parse the remote proxy URI to generate a URI object corresponding to the string that was included in the remote proxy URI (i.e., non-proxy URI).

In one set of embodiments, URI rewriter factory 106 can iterate through a list of URI rewriters stored in URI rewriter repository 118 to identify a URI rewriter for an input URI string received by processing system 102. In one embodiment, given an input URI string and a list of URI rewriters stored in URI rewriter repository 118, URI rewriter factory 106 can call a function groksUri( ) associated with each URI rewriter, and if the function groksUri( ) associated with a URI rewriter returns a vale of "true", this indicates that the URI rewriter recognizes the input URI string and may be selected for parsing the input URI string. In one embodiment, URI rewriter factory 106 can select the first URI rewriter that returns a value of "true" from executing the function groksUri( ) associated with the URI rewriter. If none of the URI rewriters in the list of URI rewriters stored in repository 118 return a "true" from executing the function groksUri( ) associated with the URI rewriter for an given input URI string received by processing system 102, then an error message can be generated and output by URI rewriter factory 106 indicating that the input URI string cannot be parsed by processing system 102. In one embodiment, the list of URI rewriters stored in URI rewriter repository 118 can be expanded to include additional URI rewriters. For example, a developer may add additional URI rewriters to the list and store the additional URI rewriters in URI rewriter repository 118.

After a URI rewriter is selected by URI rewriter factory 106 for an input URI string received by processing system 102, the input URI string and other information associated with the input URI string (such as a map of template values and keys) can be provided to the selected URI rewriter (e.g., URI rewriter 108) for further processing. In particular, URI rewriter 108 can parse the input URI string to generate a URI object such as URI manipulator 110. URI manipulator 110 can then be invoked to perform various operations on the input URI string, such as outputting the original URI included in the input URI string (i.e., the URI string before it was rewritten).

Table 1 presents a list of functions that can be implemented and executed by URI rewriter 108 for facilitating transparent manipulation of an input URI string received by processing system 102. These functions can be implemented in software (e.g., code, instructions, program) executed by a processor of processing system 102, hardware, or combinations thereof. In one embodiment, the functions listed in Table 1 can be implemented in a Javascript URI parser such as the bea.wlp.disc.uri.Uri object included in Oracle WebLogic Portal, developed by Oracle Coporation. It should be apparent that the various functions depicted in Table 1 are not intended to limit the scope of the present invention as recited in the claims. For example, URI rewriter 108 may implement more or less functions than those depicted in Table 1.

TABLE 1

| | |
|---|---|
| public string | getFullUriString( ) |
| | Get the full string for the URI string associated with this instance, including the prefix and suffix. |
| public bea.wlp.disc.uri.Uri | getProxyUri( ) |
| | Get the proxy URI for the URI string associated with this instance. |
| public bea.wlp.disc.uri.Uri | getTargetUri( ) |
| | Get the target URI for the URI string associated with this instance. |
| public string | getUriPrefix( ) |
| | Get the prefix for the URI string associated with this instance. |
| public string | getUriSuffix( ) |
| | Get the suffix for the URI string associated with this instance. |
| public static boolean | groksUri(uriStr, [tmpltMap]) |
| | Determine if this URI rewriter recognizes the given URI string to parse the URI string. |
| public boolean | isProxyUri( ) |
| | Determine if the URI string for this instance is a proxy URI that contains a target URI. |
| public object | parseUriStrParts(uriStr) |
| | Parse the prefix, URI string, and suffix from a recognized javascript pseudo-protocol link. |
| public void | refreshTargetOnProxyUri( ) |
| | Set the instance target URI as a parameter (or path or whatever) of the instance proxy URI. |
| public void | setProxyUri(proxyUri) |
| | Set the proxy URI for this instance. |
| public void | setTargetUri(targetUri) |
| | Set the target URI associated with this instance. |

TABLE 1-continued

| | |
|---|---|
| public void | setUriPrefix(prefix) |
| | Set the prefix for the URI associated with this instance. |
| public void | setUriSuffix(suffix) |
| | Set the suffix for the URI associated with this instance. |
| public static object | staticParseUriStrParts(uriStr) |
| | Parse the prefix, URI string, and suffix from a recognized javascript pseudo-protocol link. |

EXAMPLES

This section provides an example manipulation performed by URI rewriter 108 for an input URI string according to an embodiment of the present invention. This example is not intended to limit the scope of the application as recited in the claims.

(1) Receive an input URI string that has been rewritten into a remote proxy URI:

"http://proxy.eg.com/proxy/www.oracle.com"

(2) Determine if the input URI string is a proxy URI string. For example, function isProxyUri( ) can be called to determine if the input URI string is a proxy URI. Since the input URI string in this example is a proxy URI that includes a target URI, function isProxyUri( ) can return a boolean result as follows:

"true"

(3) Parse the input URI string to retrieve the target URI included in the input URI string. For example, function getTargetUri( ) can be called to extract the target URI from the input URI string. Since the input URI string in this example is a proxy URI that includes a target URI, the function getTargetUri( ) can return a target URI as follows:

"http://www.oracle.com"

For the example described above, if the received input URI string is not a proxy URI (e.g., if the received input URI string is "http://www.oracle.com"), then function isProxyUri( ) can return "false". Similarly, function getTargetUri( ) can return the input URI string as the target URI.

This section provides another example manipulation performed by URI rewriter 108 for an user input URI string according to an embodiment of the present invention. This example is not intended to limit the scope of the application as recited in the claims.

(1) Receive an input URI string that has been rewritten into a Javascript pseudo-protocol link, such as:

"javascript:bea.wlp.disc.xie._Service.update('http://www.oracle.com')"

(2) Parse the input URI string to retrieve a prefix, a URI string, and a suffix from the input URI string. For example, function parseUriStrParts(uriStr) can be called to extract the prefix, the URI string, and the suffix from the input URI string. Since the input URI string in this example is a Javascript pseudo-protocol link, function parseUriStrParts(uriStr) can return the following:

Prefix→javascript:bea.wlp.disc.xie._Service.update(URI string→http://www.oracle.com Suffix→);

If the received input URI string is not a Javascript pseudo-protocol link (e.g., if the input URL string is "http://www.oracle.com"), then function parseUriStrParts(uriStr) can return a null for both the prefix and the suffix and return the input URI string as the URI string.

In this manner, a URI rewriter (e.g., URI rewriter 108) that is selected for an input URI string received by processing system 102 can facilitate the transparent manipulation of the input URI string by extracting a URI string from a Javascript pseudo-protocol link and/or a remote proxy URI. As mentioned previously, an input URI string may be rewritten into a Javascript pseudo-protocol link and/or a remote proxy URI at the client side of a Web application to support XHRs and/or WSRP. By implementing a URI rewriter factory (e.g., URI rewriter factory 106) and a URI rewriter (e.g., URI rewriter 108) as described above, a user (e.g., a Web developer) does not need to have foreknowledge about whether or not an input URI string has been rewritten for XHRs and WSRP. As a result, the same code can be used to transparently manipulate input URIs that have been rewritten for XHRs and WSRP and input URIs that have not been rewritten for XHRs and WSRP.

As discussed above, URI rewriter 108 is configured to generate a URI manipulator object 110 that corresponds to the input URI string. URI manipulator 110 includes various methods that can be invoked to perform operations on the input URI string. One such operation allows URI manipulator 110 to output the original URI string included in the input URI string. Other operations allow for the replacement of template keys in the original URI string with values, the performing create, read, update, and delete operations on one or more components of the original URI string (e.g., host, port, query parameters, etc.), and the like. In one embodiment, template replacement may be performed on the original URI string based upon a map of template keys and values received by processing system 102. For example, an original URI string such as:

"{protocol}://www.oracle.com/products?id={productId}"

can have its template keys replaced using a template map such as:

"{protocol:'http', productId:'1001':

which would result in a URI string such as:

"http://www.oracle.com/products?id=1001"

Table 2 presents a list of functions that can be implemented and executed by URI manipulator 110 to manipulate a URI string. These functions can be implemented in software (e.g., code, instructions, program) executed by a processor of processing system 102, hardware, or combinations thereof. For example, the functions listed in Table 2 can be implemented as part of a Javascript URI parser such as the bea.wlp.disc._uri.Uri object included in Oracle WebLogic Portal. It should be apparent that the various functions depicted in Table 2 are not intended to limit the scope of the present invention as recited in the claims. For example, URI manipulator 110 can implement more or less functions than the ones depicted in Table 2. Since the functions presented in Table 2 are generally standard functions that have been implemented in existing Javascript URI parsing objects, further information related to these functions is omitted from the present disclosure.

TABLE 2

| | |
|---|---|
| public void | addParameter(key, val) |
| | Adds a single value to the array of values for a multi-valued query parameter without replacing the previously set value(s). |
| public | getParameter(key) |

TABLE 2-continued

| | | |
|---|---|---|
| string | | Gets the string value of the query parameter. |
| public | getParameterMap( ) | |
| object | | Gets the map of query parameters. |
| public | getParameterNames( ) | |
| string[ ] | | Gets an array of strings containing the names of the query parameters. |
| public | getParameterValues(key) | |
| string[ ] | | Gets the string array of values of the query parameter. |
| public | getQuery( ) | |
| string | | Gets the URL-encoded query string. |
| public | getTemplateKeys(uriStr) | |
| static string[ ] | | This static method is used to discover the template key names in a templatized URI string. |
| public | removeParameter(key) | |
| void | | Removes all values for a query parameter. |
| public | replace(uriStr, tmpltMap) | |
| static string | | Performs template replacement on a templatized URI string. |
| public | setParameter(key, val) | |
| void | | Sets the string array of values for the query parameter. |
| public | setParameterMap(paramMap) | |
| void | | Sets the map of query parameters. |
| public | setQuery(qStr) | |
| void | | Sets the query string. |
| public | toString( ) | |
| string | | Gets a string representation of this Uri instance. |

In one set of embodiments, URI manipulator 110 can generate results from performing one or more operations on a URI string. For example, URI manipulator 110 can execute a function such as getParameter( ) that returns one or more string values for one or more query parameters. In one embodiment, the results generated by URI manipulator 110 can be output and/or stored. For example, the results can be output to a user via user interface 104 or may be stored in memory 112. The results from performing one or more operations by URI manipulator 110 on a URI string can include one or more strings parsed from the URI string, results from performing create, read, update, and delete operations on one or more components of the URI string (e.g., host, port, query parameters, etc.), and the like. In one embodiment, the results from performing one or more operations by URI manipulator 110 on a URI string can be displayed through a display device or system (not shown in FIG. 1).

Figure 2:
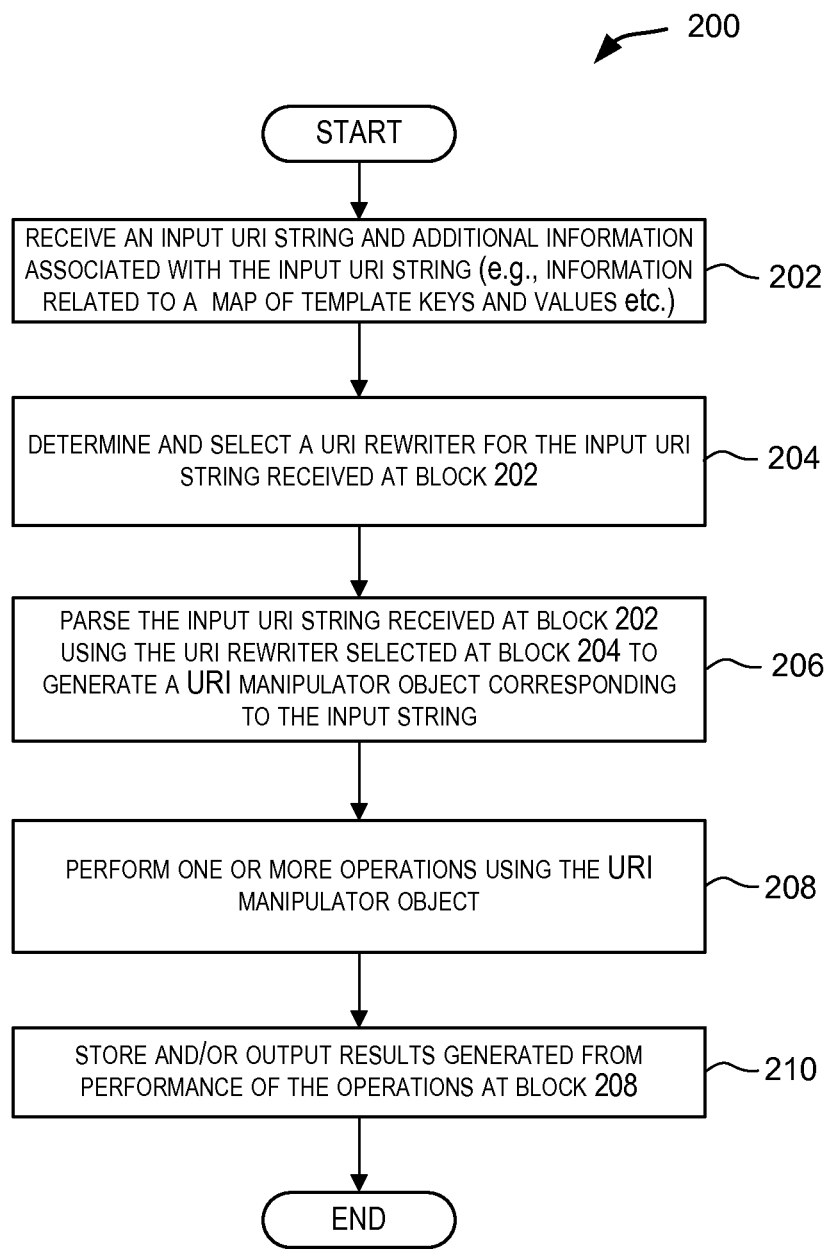
FIG. 2 is a flow diagram depicting a process for transparently manipulating a URI string according to an embodiment of the present invention.

FIG. 2 is a flow diagram depicting a process 200 for transparently manipulating URIs including URIs that have been rewritten for XmlHttpRequests (XHRs) and/or Web Services for Remote Portlets (WSRP) according to an embodiment of the present invention. Process 200 can be implemented as software (e.g., code, program, instructions) executable by a processor, hardware, or combinations thereof. In one embodiment, process 200 can be performed by processing system 102 of FIG. 1.

As shown, process 200 can be initiated upon receiving input information (block 202). The input information received at block 202 can include an input URI string. In one set of embodiments, the input URI string can be, for example, in the form of a Javascript pseudo-protocol link, and/or a remote proxy URI string. In another set of embodiments, the input URI string can original URI string that has not been rewritten for XHRs or WSRP. In one embodiment, the input information received at block 202 can also include additional information associated with the input URI string. For example, as described previously, information related to a map of template keys and values may be received at block 202 and used for performing template replacement on a URI string that is parsed from the input URI string received at block 202.

Processing is then performed to determine and select (from a list of URI rewriters maintained in a repository such as repository 118 of FIG. 1) a URI rewriter that can parse the input URI string received at block 202 (block 204). In one set of embodiments, the processing at block 204 can iterate through the list of URI rewriters maintained in the repository by executing a function groksUri( ) associated with each URI rewriter, and if the function groksUri( ) associated with a particular URI rewriter returns a value of "true", this indicates that the current URI rewriter recognizes the input URI string received at block 202 and should be selected for processing the input URI string. In one embodiment, only a first URI rewriter that returns a value of "true" from executing the function groksUri( ) is selected for parsing the input URI string received at block 202. If none of the URI rewriters recognizes the input URI string received at block 202, the processing can return an error indicating that the input URI string is not recognized. In this case, the input URI string cannot be parsed by any of the URI rewriters maintained in the repository. As a result, process 200 can terminate prematurely (not shown in FIG. 2).

If a URI rewriter is selected at block 204, the selected URI rewriter can parse the input URI string received at block 202 to generate a URI object corresponding to the input URI string (block 206). The URI object can include various methods for manipulating the input URI string, such as outputting an original URI string included in the input URI string (if the original URI string was rewritten). If the input URI string received at block 202 is a URI string in its original form (i.e., the input URI string has not been rewritten for XHRs and/or WSRP), then the URI object include a method for simply returning the input URI string. Further details related to how an input URI string can be parsed are discussed above with reference to FIG. 1.

At block 208, one or more operations can be performed using the URI object generated at block 206. The one or more operations can include, e.g., parsing the URI string, replacing template keys in the URI string with values, performing create, read, update, and delete operations on one or more components of the URI string (e.g., host, port, query parameters, etc.), and the like. In one set of embodiments, template replacement can be performed using a map of template keys and values received at block 202. Further details regarding operations that can be performed using the URI object generated at block 206 are discussed above with reference to FIG. 1.

Results obtained from performing the one or more operations described at block 208 can then be output and/or stored (block 210). For example, the results can be output to the user via a user interface (e.g., user interface 104 of FIG. 1). Alternatively, the results can be stored in memory (e.g., memory 112 of FIG. 1). The results from performing the one or more operations can include one or more strings manipulated by the URI object generated at block 206, results from performing create, read, update, and delete operations on one or more components of the URI string (e.g., host, port, query parameters, etc.), etc. In one embodiment, the results can be displayed through a display device or system.

Figure 2A:
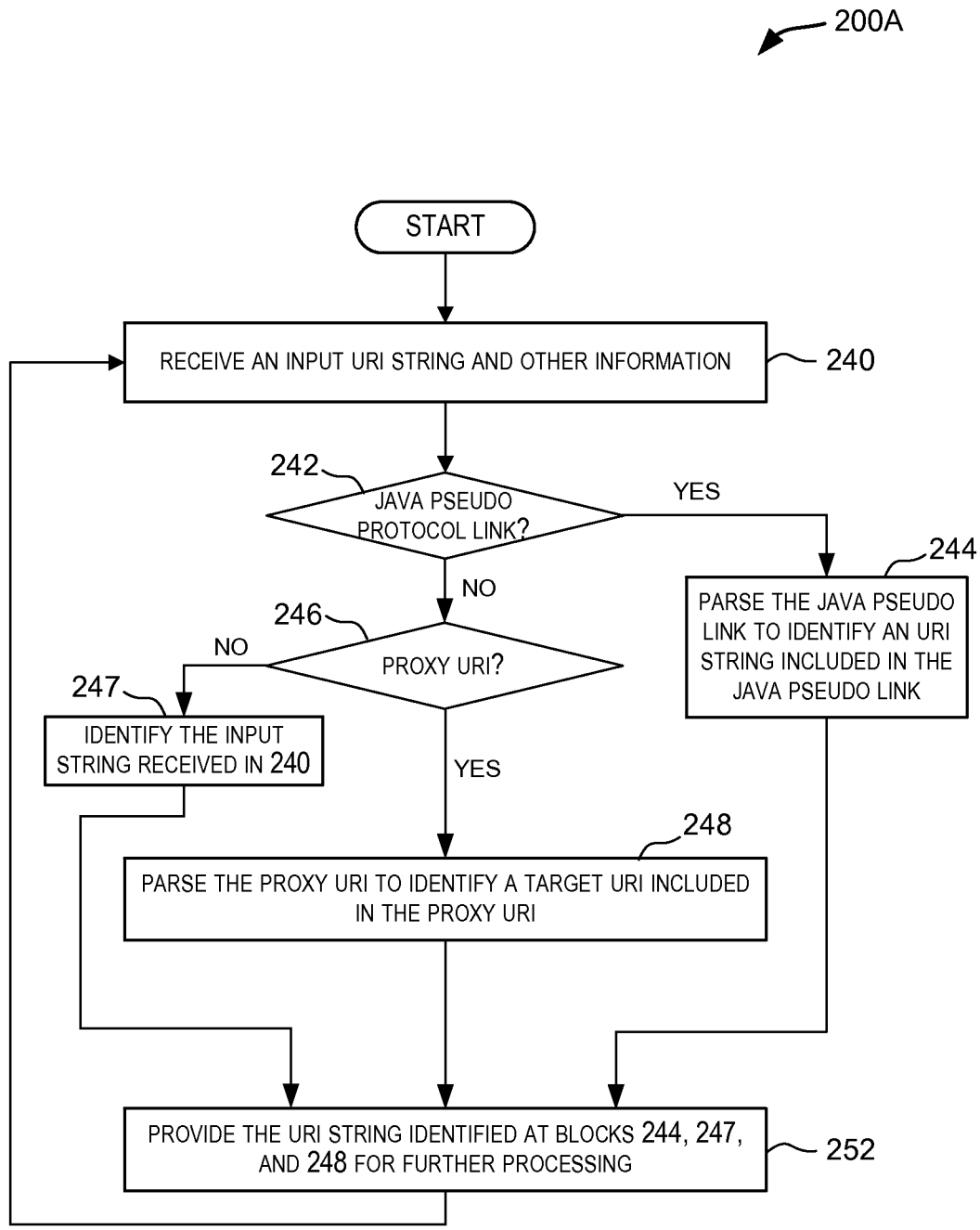
FIG. 2A is a flow diagram depicting a process performed by a URI rewriter for transparently manipulating a URI string according to an embodiment of the present invention.

FIG. 2A is a flow diagram depicting a process 200A that can be performed by a URI rewriter for transparently manipulating a URI string according to an embodiment of the present invention. Process 200A can be implemented as software (e.g., code, program, instructions) executed by a processor, hardware, or combinations thereof. In one set of embodiments, the process 200A can be performed by URI rewriter 108 of processing system 102 depicted in FIG. 1. Process 200A assumes that a URI rewriter has already been identified and selected for an input URI string received by processing system 102.

As shown, processing can be initiated upon receiving an input URI string (block 240). In one set of embodiments, the input URI string received at block 240 can be, for example, in the form of a javascript pseudo-protocol link, a remote proxy URI string, an original URI string that has not been rewritten for XHRs and WSRP, or the like. In one embodiment, the input information received at block 240 can also include additional information associated with the input URI string, such as information related to a map of template keys and values.

At block 242, a determination can be made whether the input URI string received at block 240 is written in the form of a Javascript pseudo-protocol link. If the input URI string is written in the form of a Javascript pseudo-protocol link, the input URI string can be parsed to return at least one URI string included in the Javascript pseudo-protocol link (block 244). The at least one URI string returned at block 244 can be a URI string in its original form (i.e., the URI string returned at block 244 has not been rewritten for XHRs and WRSP). The at least one URI string returned at block 244 can then be provided to processing system 102 for further processing (block 252). After block 252, processing can return to block 240 for processing the next input URI string.

If the input URI string received at block 240 is not written in the form of a Javascript pseudo-protocol link, a determination can be made whether the input URI string is written in the form of a proxy URI string (block 246). If the input URI string is written in the form of a proxy URI string, the input URI string can be parsed to return at least one URI string included in the proxy URI string (block 248). The at least one URI string returned at block 248 can be a target URI string in its original form (i.e., the URI string returned at block 248 has not been rewritten for XHRs and WRSP). The at least one URI string returned at block 248 can then be provided to processing system 102 for further processing (block 252). After block 252, processing can return to block 240 for processing the next input URI string.

If the input URI string received at block 240 is not a proxy URI, then process 200A can simply return the input URI string received at block 240 without any modification (block 247). In this case, the input URI string received at block 240 and later returned at block 247 is a URI string in its original form (i.e., the URI string returned at block 247 has not been rewritten for XHRs and WRSP). The URI string returned at block 247 can then be provided to processing system 102 for further processing (block 252). After block 252, processing can return to block 240 for processing the next input URI string.

It will be appreciated that processes 200 and 200A are illustrative and not intended to limit embodiments of the present invention. Steps described as sequential may be executed in parallel, order of steps may be varied, and steps may be modified, combined, added, or omitted. One of ordinary skill in the art would recognize many variations, modifications, and alternatives.

As described above, a client-side URI manipulation framework is provided for transparently manipulating URIs including URIs that have been rewritten for XHRs and/or WSRP. In one set of embodiments, a URI rewriter factory can be provided that is configured to determine and select a URI rewriter based upon an input URI string. The input URI string may be, for example, be in the form of a Javascript pseudo-protocol link, a remote proxy URI, etc. A URI rewriter selected for the input URI string can then parse the input URI string to generate a URI object that can perform one or more operations on the input URI string.

Embodiments of the present invention allow for transparent manipulation of URI strings regardless of whether the URI strings have been rewritten for XHRs and/or WSRP. In this manner, a user (e.g., a Web developer) does not need to have foreknowledge about whether or not an input URI string has been rewritten for XHRs and/or WSRP. As a result, the same code can be used for transparently manipulating URIs that have been rewritten for XHRs and/or WSRP and URIs that have not been rewritten at all.

Figure 3:
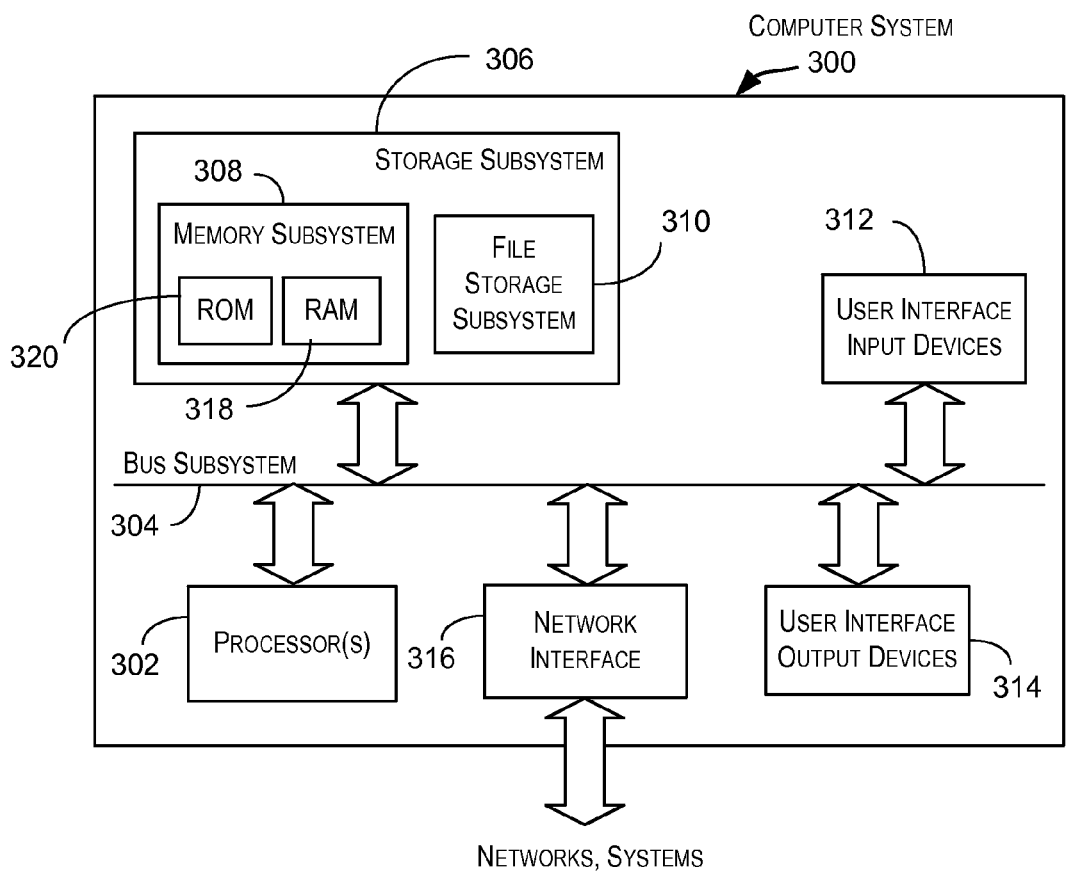
FIG. 3 is a simplified block diagram of a computer system that may be used to practice an embodiment of the present invention.

FIG. 3 is a simplified block diagram of a computer system 300 that may be used to practice an embodiment of the present invention. Computer system 300 may serve as a processing system 102 or a client system 114 depicted in FIG. 1. As shown in FIG. 3, computer system 300 includes a processor 302 that communicates with a number of peripheral subsystems via a bus subsystem 304. These peripheral subsystems may include a computer readable storage medium such as a storage subsystem 306, comprising a memory subsystem 308 and a file storage subsystem 310, user interface input devices 312, user interface output devices 314, and a network interface subsystem 316.

Bus subsystem 304 provides a mechanism for letting the various components and subsystems of computer system 300 communicate with each other as intended. Although bus subsystem 304 is shown schematically as a single bus, alternative embodiments of the bus subsystem may utilize multiple busses.

Network interface subsystem 316 provides an interface to other computer systems, networks, and portals. Network interface subsystem 316 serves as an interface for receiving data from and transmitting data to other systems from computer system 300.

User interface input devices 312 may include a keyboard, pointing devices such as a mouse, trackball, touchpad, or graphics tablet, a scanner, a barcode scanner, a touch screen incorporated into the display, audio input devices such as voice recognition systems, microphones, and other types of input devices. In general, use of the term "input device" is intended to include all possible types of devices and mechanisms for inputting information to computer system 300. A user may use an input device to enter a URI string as input to processing system 102 of FIG. 1.

User interface output devices 314 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 300.

Computer readable storage medium such as storage subsystem 306 provides a computer-readable storage medium for storing the basic programming and data constructs that provide the functionality of the present invention. Software (programs, code modules, instructions) that when executed by a processor provide the functionality of the present invention may be stored in storage subsystem 306. These software modules or instructions may be executed by processor(s) 302. Storage subsystem 306 may also provide a repository for storing data used in accordance with the present invention. For example, storage subsystem 306 can provide a storage medium for persisting a list of URI rewriters implemented in processing system 102 of FIG. 1. Storage subsystem 306 may comprise memory subsystem 308 and file/disk storage subsystem 310.

Memory subsystem 308 may include a number of memories including a main random access memory (RAM) 318 for storage of instructions and data during program execution and a read only memory (ROM) 320 in which fixed instructions are stored. File storage subsystem 310 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Computer system 300 can be of various types including a personal computer, a portable computer, a workstation, a network computer, a mainframe, a kiosk, a server or any other data processing system. Due to the ever-changing nature of computers and networks, the description of computer system 300 depicted in FIG. 3 is intended only as a specific example for purposes of illustrating the preferred embodiment of the computer system. Many other configurations having more or fewer components than the system depicted in FIG. 3 are possible.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims.

What is claimed is:

1. A computer-implemented method for manipulating a uniform resource identifier (URI), the method comprising:
receiving, at a processing system, an input string, wherein the input string includes at least one rewritten URI string that has been rewritten from an original URI string form;
interacting, at the processing system, with a plurality of URI rewriters to select a URI rewriter, wherein the interacting includes:
calling a function associated with each of the plurality of URI rewriters,
receiving a response from a first URI rewriter indicating that the first URI rewriter recognizes a format of the at least one rewritten URI string based on the first URI rewriter executing the function,
determining that the first URI rewriter is operable to parse the at least one rewritten URI string, and
selecting the first URI rewriter among the plurality of URI rewriters;
providing the at least one rewritten URI string to the selected URI rewriter, wherein the selected URI rewriter parses the at least one rewritten URI string to generate a URI manipulator corresponding to the at least one rewritten URI string, wherein the URI manipulator is configured to return at least one URI string associated with the at least one rewritten URI string, wherein the at least one URI string is in the original URI string form; and
performing, at the processing system, one or more operations on portions of the at least one URI string in the original URI string form using the URI manipulator.

2. The method of claim 1 wherein the format is a format used to support XmlHttpRequests (XHRs).

3. The method of claim 1 wherein the input string is encoded as a Javascript pseudo-protocol link or a proxy URI.

4. The method of claim 1 further comprising parsing the input string by the URI rewriter to identify the at least one rewritten URI string included in the input string.

5. The method of claim 1 wherein parsing the at least one rewritten URI string comprises parsing a Javascript pseudo-protocol link to identify at least one URI string included in the Javascript pseudo-protocol link.

6. The method of claim 1 wherein parsing the at least one rewritten URI string comprises parsing a proxy URI string to identify a target URI string included in the proxy URI string, wherein the target URI string is a non-proxy URI string.

7. The method of claim 4 wherein parsing the input string comprises returning the input string.

8. The method of claim 1 wherein the one or more Operations performed on portions of the at least one URI string comprises parsing the at least one URI string, replacing template keys with values in the at least one URI string, and performing create, read, update, and delete operations on one or more components of the at least one URI string.

9. The method of claim 1 wherein the selected URI rewriter is configured to parse the input string to identify the at least one rewritten URI string.

10. The method of claim 1, wherein the format is a format used to support Web Services for Remote Portlets (WSRP).

11. A non-transitory computer-readable storage medium storing a plurality of instructions for manipulating a uniform resource identifier (URI), the plurality of instructions comprising:
instructions that cause the processor to receive an input string, wherein the input string includes at least one rewritten URI string that has been rewritten from an original URI string form;
instructions that cause the processor to interact with a plurality of URI rewriters to select a URI rewriter, wherein the instructions cause the processor to
call a function associated with each of the plurality of URI rewriters,
receive a response from a first URI rewriter indicating that the first URI rewriter recognizes a format of the at least one rewritten URI string based on the first URI rewriter executing the function,
determine that the first URI rewriter is operable to parse the at least one rewritten URI string, and
select the first URI rewriter among the plurality of URI rewriters;
instructions that cause the processor to provide the at least one rewritten URI string to the selected URI rewriter, wherein the selected URI rewriter parses the at least one rewritten URI string to generate a URI manipulator corresponding to the at least one rewritten URI string, wherein the URI manipulator is configured to return at least one URI string associated with the at least one rewritten URI string, wherein the at least one URI string is in the original URI string form; and instructions that cause the processor to perform one or more operations on portions of the at least one URI string in the original URI string form using the URI manipulator.

12. The non-transitory computer-readable storage medium of claim 11 wherein the format is a format used to support XmlHttpRequests (XHRs) or Web Services for Remote Portlets (WSRP).

13. The non-transitory computer-readable storage medium of claim 11 wherein the input string is encoded as a Javascript pseudo-protocol link or a proxy URI.

14. The non-transitory computer-readable storage medium of claim 11 further comprising instructions that cause the processor to parse the input string to identify the at least one rewritten URI string included in the input string.

15. The non-transitory computer-readable storage medium of claim 11 wherein the instructions that cause the processor to parse the at least one rewritten URI string comprise instructions that cause the processor to parse a Javascript pseudo-protocol link to identify at least one URI string included in the Javascript pseudo-protocol link.

16. The non-transitory computer-readable storage medium of claim 11 wherein the instructions that cause the processor to parse the at least one rewritten URI_string comprise instructions that cause the processor to parse a proxy URI string to identify a target URI string included in the proxy URI string, wherein the target URI string is a non-proxy URI string.

17. The non-transitory computer-readable storage medium of claim 14 wherein the instructions that cause the processor to parse the input string comprise instructions that cause the processor to return the input string.

18. The non-transitory computer-readable storage medium of claim 11 wherein the one or more operations performed on portions of the at least one URI string comprises parsing the at least one URI string, replacing template keys with values in the at least one URI string, and performing create, read, update, and delete operations on one or more components of the at least one URI string.

19. A system for manipulating a uniform resource identifier (URI), the system comprising:

a memory configured to store an input string; and a processor coupled to the memory, wherein the processor is configured to:

receive an input string, wherein the input string includes at least one rewritten URI string that has been rewritten from an original URI string form;

interact with a plurality of URI rewriters to select a URI rewriter, wherein the processor is configured to:

call a function associated with each of the plurality of URI rewriters, receive a response from a first URI rewriter indicating that the first URI rewriter recognizes a format of the at least one rewritten URI string based on the first URI rewriter executing the function, determine that the first URI rewriter is operable to parse the at least one rewritten URI string, and select the first URI rewriter among the plurality of URI rewriters;

provide the at least one rewritten URI string to the selected URI rewriter, wherein the selected URI rewriter parses the at least one rewritten URI string to generate a URI manipulator corresponding to the at least one rewritten URI string, wherein the URI manipulator is configured to return at least one URI string associated with the at least one rewritten URI string, wherein the at least one URI string is in the original URI string form; and perform one or more operations on portions of the at least one URI string in the original URI string form using the URI manipulator.

* * * * *

UNITED STATES PATENT AND TRADEMARK OFFICE
CERTIFICATE OF CORRECTION

PATENT NO. : 8,977,652 B2  
APPLICATION NO. : 12/561885  
DATED : March 10, 2015  
INVENTOR(S) : Hoefner et al.

Page 1 of 1

It is certified that error appears in the above-identified patent and that said Letters Patent is hereby corrected as shown below:

Specification

In column 1, line 56, delete "mystuffupdate" and insert -- mystuff.update --, therefor.

In column 4, line 16, delete "mystuffupdate" and insert -- mystuff.update --, therefor.

In column 6, lines 35-36, delete "disc.uri.Uri" and insert -- disc._uri.Uri --, therefor.

In column 6, line 37, delete "Coporation." and insert -- Corporation. --, therefor.

In column 11, line 23, delete "WRSP)." and insert -- WSRP). --, therefor.

In column 11, line 37, delete "WRSP)." and insert -- WSRP). --, therefor.

In column 11, line 48, delete "WRSP)." and insert -- WSRP). --, therefor.

Claims

In column 14, lines 30-31, in Claim 8, delete "Operations" and insert -- operations --, therefor.

In column 15, line 27, in Claim 16, delete "URI_string" and insert -- URI string --, therefor.

Signed and Sealed this  
Twentieth Day of October, 2015

Michelle K. Lee  
*Director of the United States Patent and Trademark Office*